United States Patent
Souden et al.

(10) Patent No.: US 11,849,291 B2
(45) Date of Patent: Dec. 19, 2023

(54) SPATIALLY INFORMED ACOUSTIC ECHO CANCELATION

(71) Applicant: Apple Inc., Cupertino, CA (US)

(72) Inventors: Mehrez Souden, Los Angeles, CA (US); Jason Wung, Santa Clara, CA (US); Ante Jukic, Culver City, CA (US); Ramin Pishehvar, La Crescenta, CA (US); Joshua D. Atkins, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/322,539

(22) Filed: May 17, 2021

(65) Prior Publication Data

US 2022/0369030 A1 Nov. 17, 2022

(51) Int. Cl.

| H04R 3/04 | (2006.01) |
|---|---|
| H04R 3/00 | (2006.01) |
| H04R 5/04 | (2006.01) |
| G10L 25/78 | (2013.01) |
| G10L 21/0216 | (2013.01) |
| G10L 21/0208 | (2013.01) |
| H04M 9/08 | (2006.01) |

(52) U.S. Cl.
CPC ............ H04R 3/04 (2013.01); G10L 21/0216 (2013.01); G10L 25/78 (2013.01); H04R 3/005 (2013.01); H04R 5/04 (2013.01); *G10L 2021/02082* (2013.01); *G10L 2021/02166* (2013.01); *H04M 9/082* (2013.01)

(58) Field of Classification Search
CPC .. H04R 3/04; H04R 3/005; H04R 5/04; G10L 21/0216; G10L 25/78; G10L 2021/02082; G10L 2021/02166; G10L 1/16; G10L 21/0208; H04M 9/082
See application file for complete search history.

(56) References Cited

U.S. PATENT DOCUMENTS

| 7,415,117 | B2 | 8/2008 | Tashev et al. | |
|---|---|---|---|---|
| 7,515,721 | B2 | 4/2009 | Tashev et al. | |
| 8,903,108 | B2 | 12/2014 | Isaac et al. | |
| 9,497,544 | B2 * | 11/2016 | Mohammad | H04R 3/005 |
| 9,966,059 | B1 * | 5/2018 | Ayrapetian | H04R 1/08 |

(Continued)

FOREIGN PATENT DOCUMENTS

WO    WO-2012109384 A1 *  8/2012  .........  G10L 21/0208

OTHER PUBLICATIONS

Rombouts, Geert, "Adaptive filtering algorithms for acoustic echo and noise cancellation," Katholieke Universiteit Leuven, Apr. 25, 2003, 177 pages.

(Continued)

*Primary Examiner* — Joseph Saunders, Jr.
*Assistant Examiner* — Kuassi A Ganmavo
(74) *Attorney, Agent, or Firm* — Aikin & Gallant, LLP

(57) ABSTRACT

A plurality of microphone signals can be captured with a plurality of microphones of the device. One or more echo dominant audio signals can be determined based on a pick-up beam directed towards one or more speakers of a playback device. Sound that is emitted from the one or more speakers and sensed by the plurality of microphones can be removed from plurality of microphone signals, by using the one or more echo dominant audio signals as a reference, resulting in clean audio.

20 Claims, 6 Drawing Sheets

(56) References Cited

U.S. PATENT DOCUMENTS

| | | | | |
|---|---|---|---|---|
| 10,657,981 | B1* | 5/2020 | Mansour | H04R 3/005 |
| 11,205,437 | B1* | 12/2021 | Zhang | G10L 21/0232 |
| 2001/0039494 | A1* | 11/2001 | Burchard | G10L 15/26 |
| | | | | 704/E15.045 |
| 2002/0021799 | A1* | 2/2002 | Kaufholz | G10L 21/028 |
| | | | | 379/406.02 |
| 2005/0033572 | A1* | 2/2005 | Jin | G10L 21/0208 |
| | | | | 704/E21.007 |
| 2006/0182291 | A1* | 8/2006 | Kunieda | G10L 21/02 |
| | | | | 704/E21.007 |
| 2014/0324421 | A1* | 10/2014 | Kim | H04N 21/43637 |
| | | | | 704/233 |
| 2015/0098578 | A1* | 4/2015 | Dadu | H04M 9/082 |
| | | | | 381/66 |
| 2017/0180915 | A1* | 6/2017 | Adhikari | H04W 4/80 |
| 2018/0060021 | A1* | 3/2018 | Hostage | H04L 65/1069 |
| 2018/0091913 | A1* | 3/2018 | Hartung | H04R 29/007 |
| 2019/0130885 | A1* | 5/2019 | Kemmerer | H04R 3/005 |
| 2019/0259408 | A1* | 8/2019 | Freeman | G10L 21/0232 |
| 2019/0297407 | A1* | 9/2019 | Stanford-Jason | H04R 1/083 |
| 2020/0098346 | A1* | 3/2020 | Kemmerer | G10K 11/17881 |
| 2020/0193973 | A1* | 6/2020 | Tolomei | G10L 15/22 |
| 2021/0020188 | A1 | 1/2021 | Wung et al. | |

OTHER PUBLICATIONS

Herbordt, Wolfgang, "Combination of Robust Adaptive Beamforming with Acoustic Echo Cancellation for Acoustics Human/Machine Interfaces," Approved as a dissertation by the technical faculty of the Friedrich-Alexander-Universitat Erlangen-Nurnberg, Dec. 1, 2003, 293 pages.

* cited by examiner

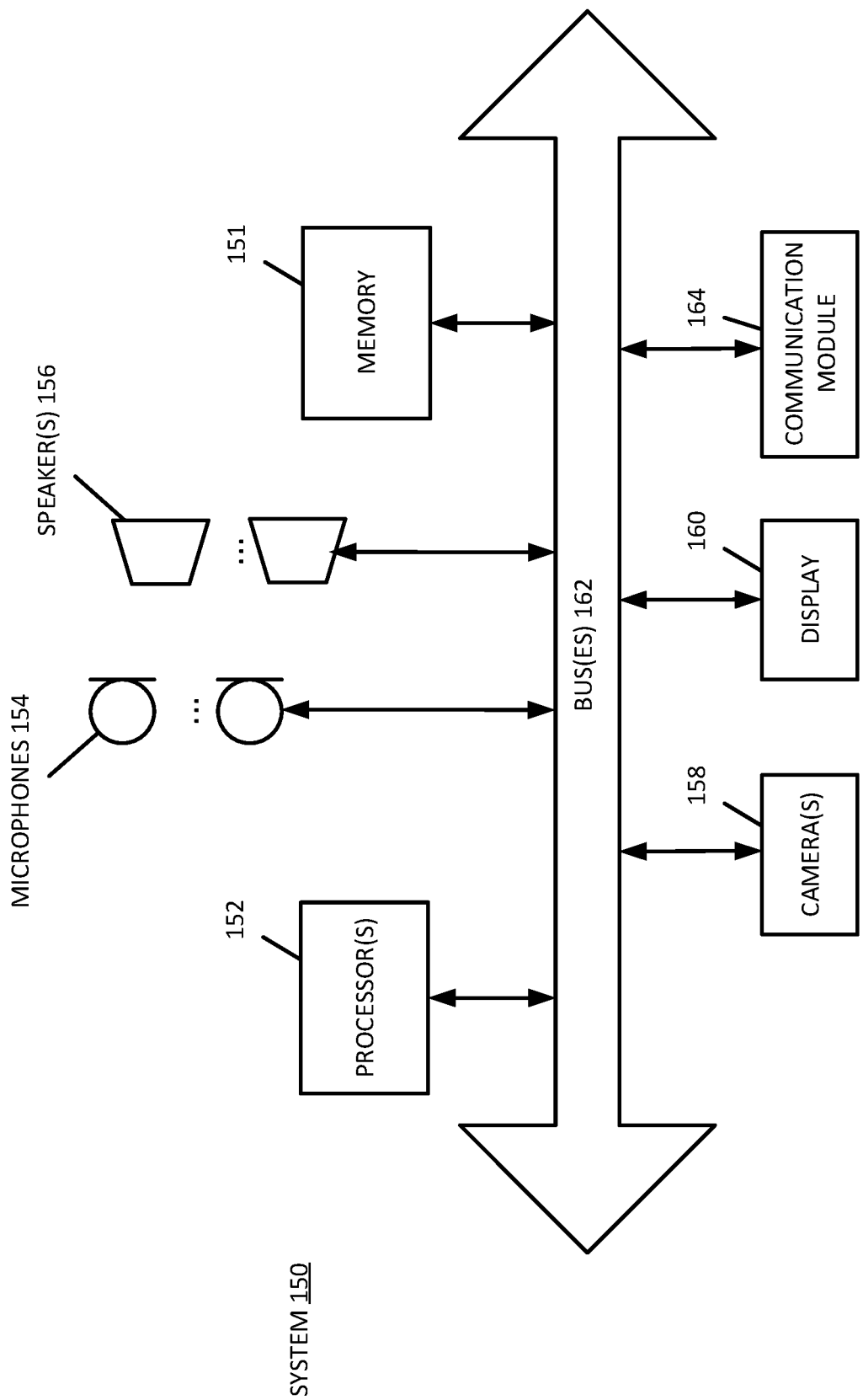

SPATIALLY INFORMED ACOUSTIC ECHO CANCELATION

FIELD

One aspect of the disclosure relates to acoustic echo cancelation.

BACKGROUND

Audio devices can have microphones that sense sounds that are present in a listening environment. An audio device may be programmed to record sounds or sense particular sounds such as speech. Some devices can perform actions based on user commands. Some devices can communicate audio to playback devices. Playback devices can drive speakers with the audio signals to produce sound.

SUMMARY

Modern devices can have microphone arrays and can be controlled by issuing speech commands to the device. For example, some electronic devices, such as a voice controlled TV, smart speakers, phones, desktop computers, laptops, tablet computers, and other voice controlled digital devices, can perform one or more actions based on detected speech. The devices can make phone calls, send messages, play media content, get information/news, or setup reminders. In some cases, these devices (e.g., a source device) stream audio to other devices that perform playback of the audio content. A strong acoustic coupling can develop between microphones of the device and speakers of the playback device. The coupling can increase depending on loudness of the audio playback and relative positions of the device and playback device. Such coupling can interfere with audio processing of the microphone signals. An echo canceler can be used to reduce or remove such coupling, however, non-linear behavior and/or asynchronous behavior of the speakers of the playback device can impede the effect of the echo canceler, and in some cases, a playback reference signal may not be readily available to the audio capture system to use for echo canceling.

For example, one or more audio signals (e.g., speaker channels) that are streamed from a source device to a playback device can be used by the source device as a reference, when available, to an echo canceler. The echo canceler can clean the microphone signals by cancelling sounds produced by the playback device and inadvertently picked up by the microphones of the source device. Thus, interference from the playback device can be reduced so that the microphone signals can be processed (e.g., for detecting speech).

As mentioned, however, the output of the loudspeakers of the playback device and the reference signals available to the echo canceler of the source device may be asynchronous. For example, an audio signal at a source device (e.g., a media streaming device) and audio that is output of through loudspeakers of a playback device (e.g., a television) can be out of sync. This asynchronous behavior can exist due to latencies caused by communication protocols, hardware, software, etc. The asynchronous behavior can result in delays, and in some cases these delays are not constant but can change from one moment to another. In some cases, the playback device and speakers thereof can experience acoustic distortions or other non-linear behavior such as when the speakers operate at or beyond its limits. The acoustic behavior of the playback device and speakers thereof can be unknown to the source device, and can vary from one playback device to another, e.g., depending on manufacturer, make, and model. As such, using the audio signal that is streamed to the source device as a reference to the echo canceler may not be ideal in some situations.

In some aspects, spatial information of a microphone array of a device relative to loudspeakers of a playback device can be leveraged to remove sound emitted from the loudspeakers and picked up by the microphone array. These sounds could otherwise interfere with processing of the microphone signals (e.g., speech detection, speech recognition, audio recording, etc.). In some cases, the relative location of the loudspeakers with respect to microphones is invariant or has little variability. For example, a device can be placed on a coffee table and that device can stream audio device to a television. The position of the television and the device will not typically move, thus, their relative positions can also be invariant or have little variability.

Leveraging spatial information provides an efficient and low complexity reduction of loud echo, leading to higher speech recognition, improved intelligibility such as for telephony, and voice trigger detection accuracy. Aspects of the present disclosure can be helpful in cleaning the microphone signals, especially in situations when playback is loud, when the loudspeakers behave in a non-linear manner, and/or when the reference available to an echo canceler of the device and the output of the playback device are asynchronous.

In some aspects, a method, performed by a device, includes capturing a plurality of microphone signals with a plurality of microphones of the device. One or more echo dominant audio signals can be determined based on a pick-up beam or a plurality of pick-up beams directed towards one or more speakers of a playback device that is separate from the device. Sound that is emitted from the one or more speakers and sensed by the plurality of microphones can be removed from plurality of microphone signals, by using the one or more echo dominant audio signals as a reference, resulting in clean audio.

In such a manner, spatial information and filtering (e.g., beamforming) can be leveraged to produce a reference that has a dominating amount of echo. This reference can have a more accurate version of audio that is picked up by the microphones of the device, as compared to the audio information that is streamed to the device, because the improved reference focuses on the output of the playback device's loudspeakers thereby accounting for asynchronous and non-linear behavior of the playback device.

In some aspects, a method, performed by a device, includes capturing a plurality of microphone signals with a plurality of microphones of the device. One or more clean input audio signals are determined based on a pick-up beam that directs a null towards one or more speakers of a playback device that is separate from the device. Sound that is emitted from the one or more speakers is removed from the one or more clean input audio signals, using audio that is streamed to the playback device as a reference. In some aspects, an audio processing system or device has one or more processors that are configured to perform the methods discussed.

It should be understood that 'echo' as used in the present disclosure can include direct (acoustic energy that has not reflected off of a surface) and/or indirect (acoustic energy that has reflected off of a surface) sound. This acoustic energy can be emitted from loudspeakers and picked up by microphones of a separate device. An echo canceler can use a signal as a reference (e.g., a reference signal) to remove those sounds present in the reference signal from another audio signal, thereby canceling echo. It should be understood that 'canceling' or 'removing' is does not typically result in a complete removal. As such, aspects of the present disclosure that refer to canceling or removing are interchangeable with 'reducing'.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 6 illustrates an example of audio system hardware, according to some aspects.

DETAILED DESCRIPTION

Several aspects of the disclosure with reference to the appended drawings are now explained. Whenever the shapes, relative positions and other aspects of the parts described are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
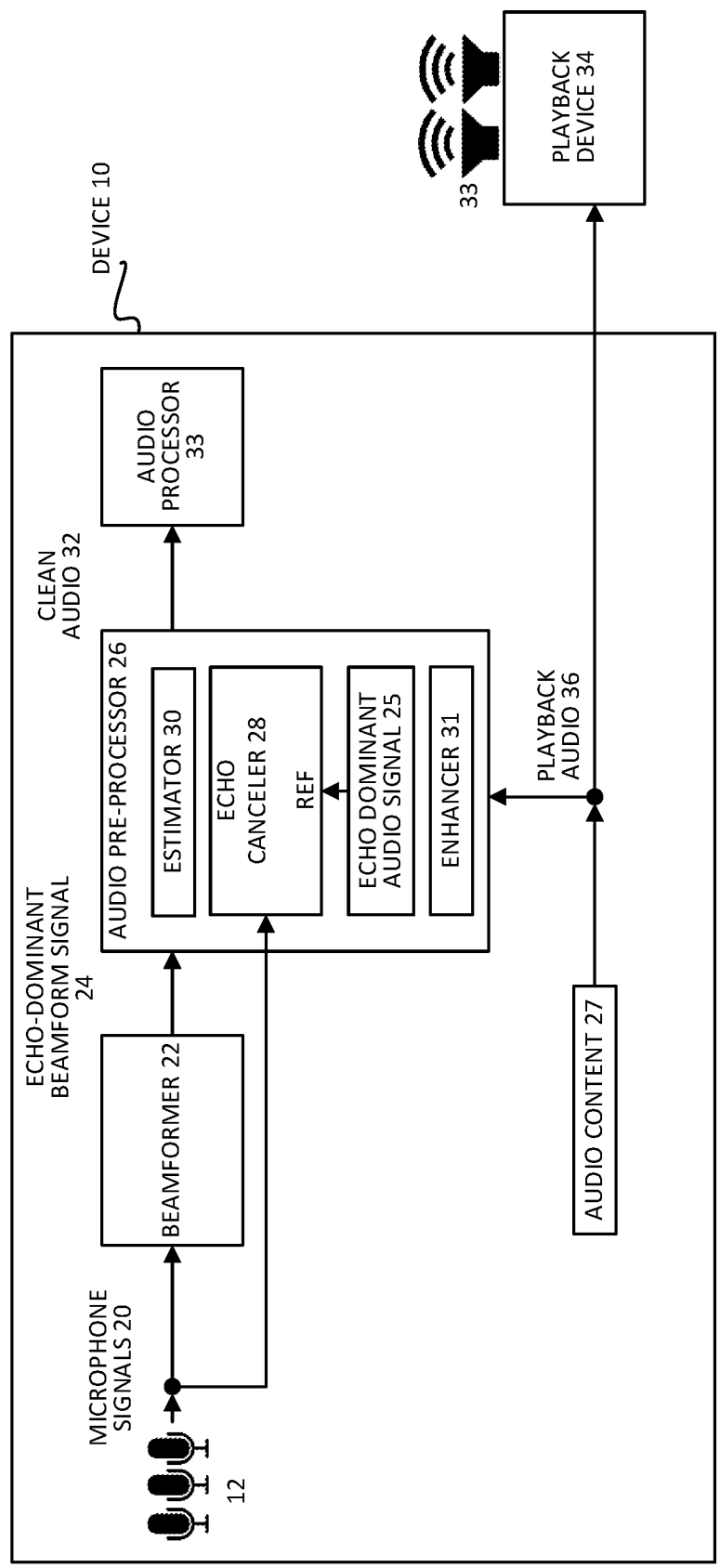
FIG. 1 shows a system and flow diagram for removing undesirable sound picked up in microphone signals with spatial filtering, according some aspects.

FIG. 1 shows a system and flow diagram for removing undesirable sound picked up in microphone signals with spatial filtering, according some aspects. A plurality of microphone signals 20 can be captured with a plurality of microphones 12 of the device 10. The microphones can be arranged on or within a housing of the device, thus forming a microphone array with fixed geometry.

Playback device 34 can be fixed to or enclosed with a second housing (e.g., a television enclosure, a loudspeaker cabinet, etc.) that is separate from the housing of the device 10. As such, the device 10 and the playback device 34 can have different positions in a listening area (e.g., within a room). In some cases, they can be located in different listening areas (e.g., different rooms). Acoustic coupling can be present between the devices, such that the output of loudspeakers 33 are inadvertently picked up by microphones 12, thus interfering with the audio processing of microphone signals 20.

Spatial information can be extracted from the microphone signals 20 with beamformer 22. Beamforming, also known as spatial filtering, can be used for directional audio transmission (e.g., with a loud speaker array) or for directional audio reception (e.g., with a microphone array). Microphone signals 20 can be spatially filtered to emphasize acoustic pick-up at different directions and distance in a listening area. The beamformer can determine and apply beamforming coefficients that, when applied to the microphone signals, create constructive and/or destructive interference of the information of the microphone signals, resulting in a beam pattern. As such, some regions of the listening area are emphasized while others are de-emphasized. Different beamforming coefficients can be applied to the microphone signals to form different beam patterns with varying geometry, such as, for example, varying a size, shape, and/or number of beams in the beam pattern. The beam pattern can be determined to selectively emphasize on different regions of the listening area, thus achieving spatial selectivity.

In some aspects, the beamforming coefficients that are used to form the pick-up beam are determined when the device streams audio to the playback device. The device 10 can use the audio that is streamed to the playback device as an indicator that the playback device is active. When it is active, the device can form pick-up beams at different locations and review which of those pick-up beams contains the strongest version (e.g., signal to noise ratio, loudness, or other measure of strength) of the playback audio. Beamforming coefficients for the beam with the strongest version of the playback audio can then be used to form an echo-dominant pick-up beam with associated beamform signal 24. A beamform signal contains the sounds picked up by a pick-up beam formed by the beamformer, like how a microphone signal contains sounds picked up by a microphone. The beamforming coefficients can also be stored in memory for later use.

One or more echo dominant audio signals 25 are determined based on the one or more echo-dominant pick-up beams 24 that are directed towards one or more speakers 33 of the playback device 34, which, as discussed, can separate from the device. Echo canceler 28 can use the echo-dominant pick-up beam signals directly or indirectly as a reference to the echo canceler.

In some aspects, the one or more echo dominant audio signals are determined by using the pick-up beam to estimate a sound field at each location of the plurality of microphones. For example, based on known direction and geometry of the pick-up beam and known positions of each of the microphones 12, an estimator 30 can determine the sound field and presence of audio emitted by loudspeakers 33 at each of the microphones 12. Each of these estimations are echo-dominant audio signals, that are then used as a reference to remove the echo from the microphone signals 20.

In some aspects, the pick-up beam is used, e.g., directly, as the one or more echo dominant audio signals. As such, the echo canceler 28 can use the pick-up beam's audio signal as a reference to remove sound emitted by the loudspeakers and picked up by the microphones 12. In some aspects, a plurality of pick-up beams are formed, to match the number of microphone signals 20, and each of the beams or a subset thereof are used as the one or more echo dominant audio signals.

In some aspects, the audio (e.g., playback audio 36) that is streamed by the device to the playback device is cleaned of other audio signals present in the room at enhancer block 31 using the pick-up beam, resulting in an enhanced audio that is used as the one or more echo dominant audio signals. For example, if the echo-dominant beamform signal is below a strength threshold, the enhancer can still extract delay information and/or non-linear behavior with the beamformer, which points towards the playback device and reduces other concurrent signals in the room including the target speech. The enhancer can then produce an enhanced version of the playback audio as a reference. The playback audio 36 can include a plurality of audio channels (e.g., for different loudspeakers).

In some aspects, linearly constrained minimum variance filters are used at block 22 to form one or more pick-up beams and create the one or more echo dominant audio signals 25. The spatially informed filter can be pre-trained based on a linearly constrained minimum variance algorithm. The spatial filter that can generate one or more pick-up beams based on a covariance matrix of the multichannel microphone signals, and an estimate of the linear echo path from the speakers to the microphones. In such a manner, the number of new reference signals, each corresponding to a pick-up beam, can be equal to the number of microphones of the device. All the new reference signals or a subset thereof can be used by the echo canceler. In some aspects, device 10 can include speakers that are integrated on or within a housing of device 10. Measured impulse responses of these speakers can be used to pre-train the one or more pick-up beams.

At echo canceler block 28, sound that is emitted from the one or more speakers 33 and sensed by the plurality of microphones 12 is removed from the plurality of microphone signals, by using the one or more echo dominant audio signals as a reference, resulting in clean audio 32. This clean audio can then be utilized by an audio processor 33. In some aspects, a speech detection algorithm is applied to the clean audio at the audio processor block. In some aspects, voice trigger, audio recording, and/or command processing can be performed. Additionally, or alternatively, the clean audio can be used for telephony (e.g., audio communications between two or more parties in real-time). As discussed, the clean audio may still contain trace amounts of sound emitted from the loudspeakers.

In some aspects, the sound that is emitted from the one or more speakers is removed from the plurality of microphone signals when the device streams audio to the playback device. The playback audio 36 can thus be used to turn on the echo canceler when the playback device is known to be active, and turn off the echo canceler when the playback device is not streaming content to the playback device.

Figure 2:
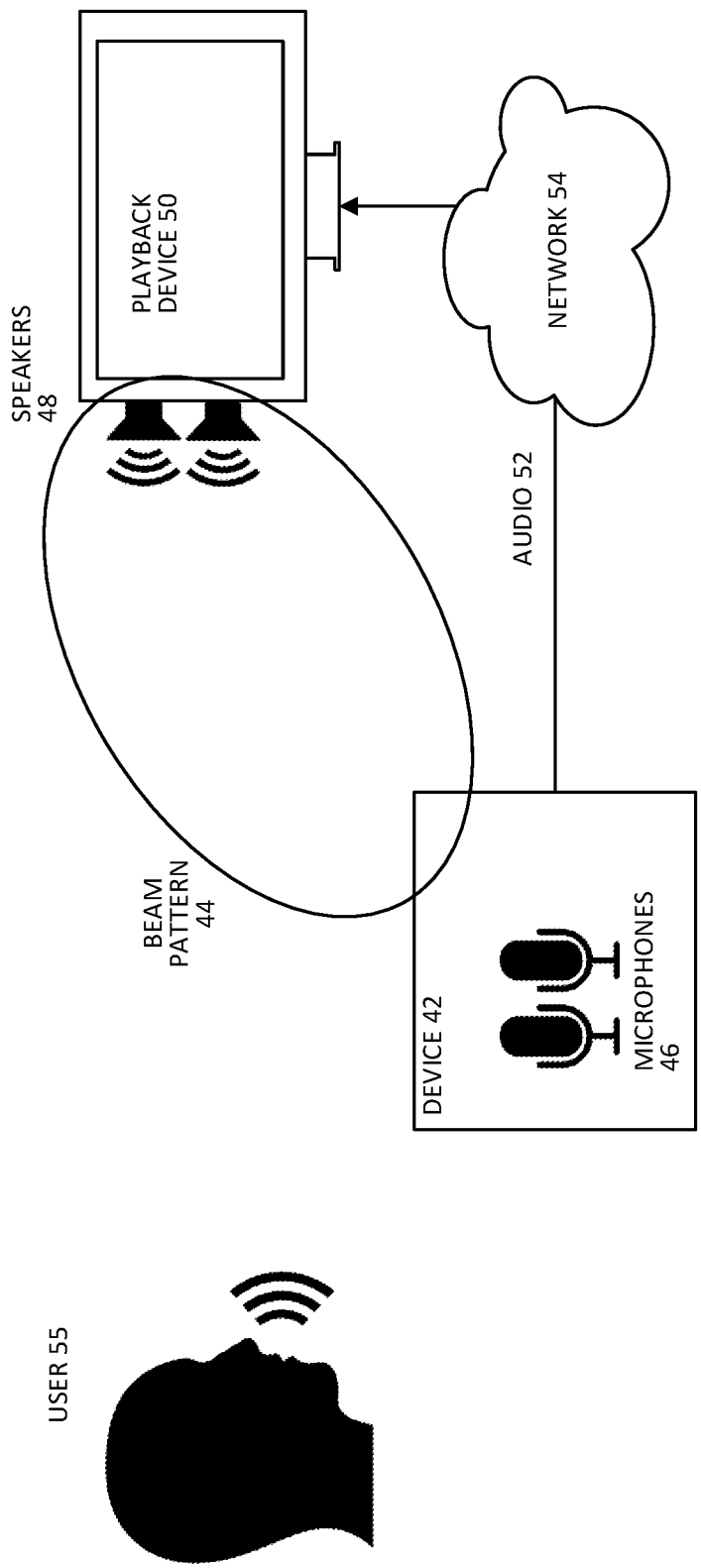
FIG. 2 illustrates an example of using spatial filtering to remove undesirable sound, according some aspects.

FIG. 2 illustrates an example of using spatial filtering to remove undesirable sound, according some aspects. A device 42 can have a plurality of microphones 46. This device can stream audio 52 to a playback device 50. The device can communicate with the playback device through a wired or wireless connection, e.g., through a network 54. Communication can be performed through one or more communication protocols such as TCP/IP, WI-FI, Bluetooth, LTE, or equivalent technologies. The device 42 can have the features described with respect to device 10 of FIG. 1. Device 42 and playback device 50 can each be a computing device such as, for example, a media player device, a smart speaker, a television, headphones, a phone, a tablet computer, a loudspeaker, an IOT device, or other computing device.

The device 42 can use a beamformer (e.g., a spatially informed multichannel filter) to create one or more beam patterns 44 and respective audio signals. As shown, a beam pattern be directed to emphasize sensing at the output of the speakers 48. The audio signal from the beam pattern can be used as reference signals for an echo canceler of the device.

The device 42 may be configured to process the microphone signals in order to respond to sounds in the listening area, such as speech from a user 55. The output of the speakers 48 can interfere with this processing unless removed by the device 42. As such, the device can better 'hear' the listener. It should be understood that beam pattern 44 is a simplified beam pattern. A beam pattern can include numerous lobes, in numerous directions with differences in size.

In some aspects, beamform coefficients can be determined offline, before deployment. To determine the coefficients, a playback reference signal can be played in an anechoic room with minimal noise floor in order to capture the acoustic properties of the device only and not the room. As discussed, beamform coefficients, also known as a spatial filter, can be applied to the microphone signals to produce one or more pick-up beams. The multichannel spatially informed filter is then pre-calculated and used in runtime. These beamform coefficients can remain fixed, or adapt after deployment. In some aspects, beamform coefficients can be determined and/or adjusted opportunistically, when playback is dominant. The pick-up beam can be adjusted opportunistically when the system is confident that the playback signal is dominant (e.g., based on loudness or strength of the playback as sensed by the microphones). This allows the device to adapt to potentially changing acoustic paths between the microphone array and the loudspeakers. For example, if device 42 is moved from one location to another in the listening area, then the path from the speakers of the playback device to the microphones of device 42 changes. As such, the beam pattern 44 can be adapted when playback is dominant, to accommodate for the new respective positions of the device and/or playback device. This can include a modification to the beam pattern's shape, size, and/or direction.

Figure 3:
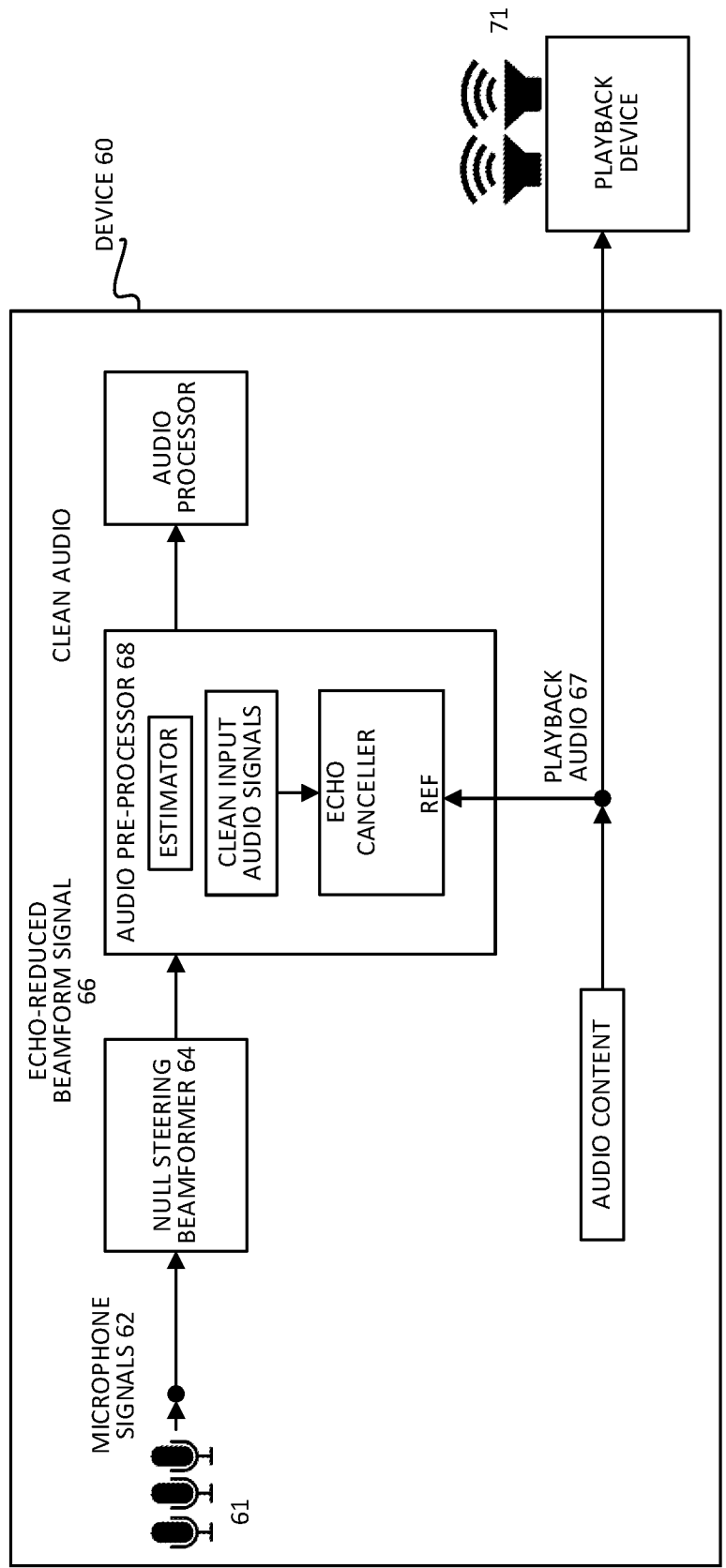
FIG. 3 shows a system and flow diagram for removing undesirable sound picked up in microphone signals with null steering, according some aspects.

FIG. 3 shows a system and flow diagram for removing undesirable sound picked up in microphone signals with null steering, according some aspects. A device 60 can have a plurality of microphones 61 that capture a plurality of microphone signals. As discussed with respect to FIG. 1, the device 60 and the playback device in FIG. 3 can have separate housings and located in different locations in the same or different listening area.

The device 60 can determine one or more clean input audio signals based on a pick-up beam that directs a null towards one or more speakers 71 of a playback device that is separate from the device. The null steering beamformer 64 can form a pick-up beam by applying beamform coefficients to the microphone signals. The beam pattern can have a region that does not pick-up sound (e.g., a null region). This null region is steered at the one or more speakers of the playback device. Other regions of the beam pattern can pick-up sounds in the listening area. As such, the resulting audio signal is an echo-reduced beamform signal 66 that contains a reduced amount of sound that is emitted from the speakers of the playback device. In some aspects, the null steering beamformer can produce a plurality beam patterns that steer null at the speakers of the playback device, resulting in a plurality of echo-reduced beamform signals.

At audio pre-processor block 68, the one or more echo-reduced beamform signals can be used directly as the clean input audio signals 69 and fed into the echo canceler. Alternatively, an estimator can estimate the sound field at each of the microphones 61 using the echo-reduced beamform signals. At the echo canceler, sound that is emitted from the one or more speakers is removed from the one or more clean input audio signals, using audio (e.g., playback audio 67) that is streamed to the playback device as a reference.

In some aspects, the sound that is emitted from the one or more speakers is removed from the plurality of microphone signals when the device streams audio to the playback device. As such, the playback audio can be used as a switch to turn the echo canceler on or off, thereby reducing the processing load of the device.

Similarly, in some aspects, beamforming coefficients that are used to form the pick-up beam are determined when the device streams audio to the playback device. As such, the beamformer can adapt dynamically when the playback audio signal is on, which indicates that the playback device may be outputting audio. As discussed with respect to FIG. 1, the beamforming coefficients can be determined through producing a plurality of beam patterns at different directions and then determining which of these steers the best null at the loudspeakers of the playback device. This can be determined, for example, by comparing each of the beam patterns with the playback audio to determine which of the beam patterns has a weakest pick-up of the speaker output.

Similar to the device described in FIG. 1, an audio processor of device 60 can perform one or more speech detection algorithms on the clean audio and respond to speech based commands.

Figure 4:
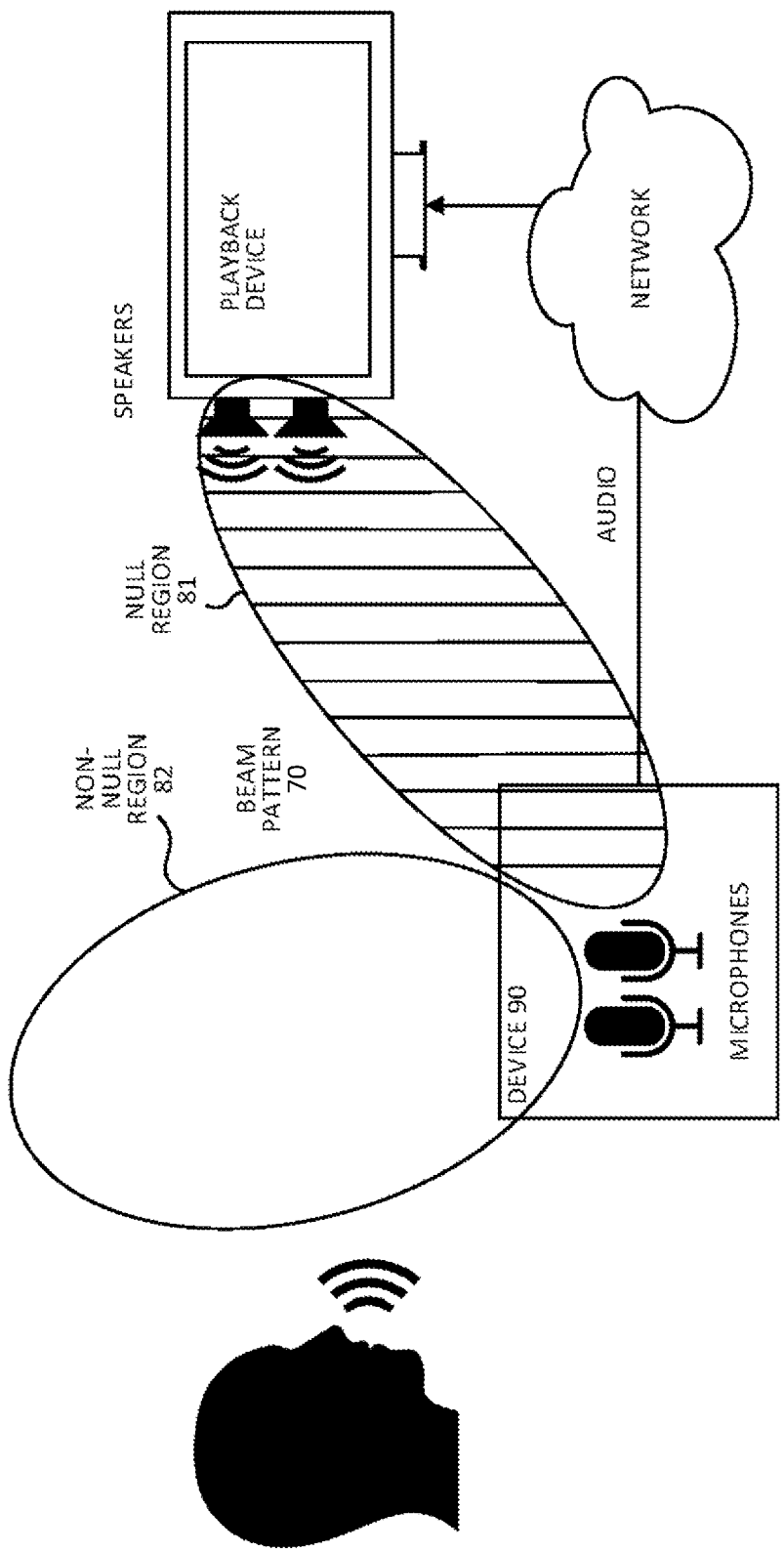
FIG. 4 illustrates an example of using null steering to remove undesirable sound, according some aspects.

FIG. 4 illustrates an example of using null steering to remove undesirable sound, according some aspects. A beamformer of device 90 can produce a beam pattern 70 having one or more null regions 81 and one or more non null regions 82. The null region 81 can be directed at the loudspeakers of the playback device while a non-null region 82 of the beam pattern picks up sounds elsewhere in the listening area. As such, the resulting beamform signal contains a reduced amount of sound emitted by the speakers of the playback device. It should be understood that the playback devices described in any of the figures can have a single loudspeaker, or multiple loudspeakers.

In some aspects, the beam pattern can be determined offline. For example, to pre-train the beamformer of the device, playback (e.g., white Gaussian noise that spans the full spectrum of interest) can be recorded in a quiet, non-reverberant room. This gives microphone recordings that can be expressed at time frequency bin (f,t) as y(f,t)≈g(f)s(f,t)+n(f,t), where s(f,t) is the playback signal played by the loudspeakers, g is the linear echo path from the speakers to the microphones, and n is noise such as, for example, residual modeling error, or low background noise due to sensors or the room. In some aspects, a linearly constrained minimum variance-based beamformer, with one or multiple Eigenspace directions, is used to form a plurality of beamform signals. For example, a null steering beamformer can be used that assumes that the recorded playback lays on a single direction. Such a null steering beamformer can be modeled based on a covariance matrix of the multichannel microphone signals and an estimate of the linear echo path from the speakers to the microphones. As such, multiple null steered beamformer signals can be obtained, each of the beamformer signals corresponding to each of the microphone signals. This linearly constrained minimum variance-based beamformer technique can also be used by the beamformer of FIG. 1.

Figure 5:
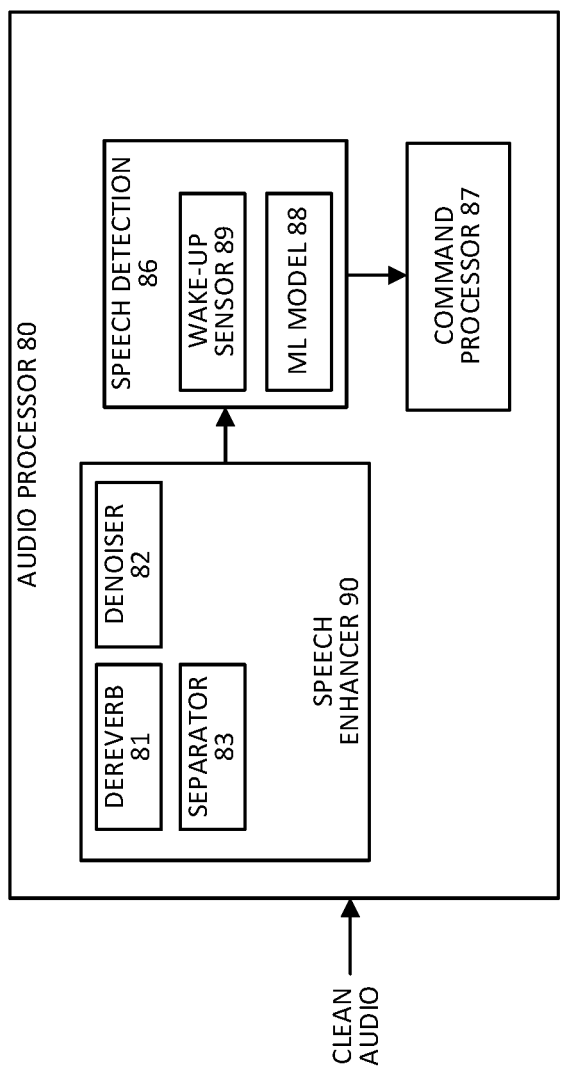
FIG. 5 shows an audio processor that performs speech detection, according to some aspects.

FIG. 5 shows an audio processor 80 that performs speech detection, according to some aspects. The audio processors FIG. 1 or FIG. 3 can share these features. A speech enhancer 90 can apply dereverberation to the clean audio signal to remove reverberant components. A denoiser 82 can reduce the noise, which can be characterize as sound other than speech in the clean audio signal. A separator can extract speech from the clean audio signal. At speech detection block 86, one or more machine learning models 88 can be trained to recognize speech. In some cases, a wake-up sensor 89 may be trained to recognized a limited set of key phrases or words such as 'Excuse me Miss' or 'Hey Sir'. A command processor 87 may contain logic to execute one or more instructions or algorithms in response to the recognized speech. The devices and methods described in the present disclosure can implement other audio processors and speech recognition techniques without departing from the scope of the present disclosure.

FIG. 6 shows a block diagram of audio processing system hardware, in one aspect, which may be used with any of the aspects described herein (e.g., headphone set, mobile device, media player, smart speaker, computer, tablet computer, television, etc.). This audio processing system can represent a general purpose computer system or a special purpose computer system. Note that while various components of an audio processing system that may be incorporated into a device are shown, it is merely one example of a particular implementation and is merely to illustrate the types of components that may be present in the audio processing system. This example is not intended to represent any particular architecture or manner of interconnecting the components as such details are not germane to the aspects herein. It will also be appreciated that other types of audio processing systems that have fewer components than shown or more components than shown can also be used. Accordingly, the processes described herein are not limited to use with such hardware and software.

As shown, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. Camera 158 and display 160 can be coupled to the bus.

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "processor", "beamformer", "denoiser", "separator", "enhancer", "canceler", "estimator", "module," "logic", and "detector" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method, performed by a device, comprising:
streaming, by a controller of the device, audio to a playback device that is separate from the device and that is configured to emit sound of the audio from one or more speakers of the playback device;
while streaming the audio to the playback device,
receiving, by the controller, a plurality of microphone signals captured by a plurality of microphones of the device;
producing, by the controller, one or more pick-up beam patterns directed towards the one or more speakers of the playback device that capture the sound emitted from the one or more speakers of the playback device using at least some of the plurality of microphone signals;
determining, by the controller, one or more echo dominant audio signals based on the one or more pick-up beams; and
producing, by the controller, clean audio by removing, from the plurality of microphone signals, the sound that is emitted from the one or more speakers, wherein the sound is removed by using the one or more echo dominant audio signals as a reference.

2. The method of claim 1, wherein the one or more echo dominant audio signals are determined by using the one or more pick-up beams to estimate a sound field at each location of the plurality of microphones.

3. The method of claim 1, wherein the one or more pick-up beams are used as the one or more echo dominant audio signals.

4. The method of claim 1, wherein the streamed audio is captured using the one or more pick-up beams resulting in an enhanced audio that is used as the one or more echo dominant audio signals.

5. The method of claim 1, wherein removing the sound that is emitted from the one or more speakers from the plurality of microphone signals includes activating an echo canceler that uses the one or more echo dominant audio signals as a reference when the device streams the audio to the playback device, and deactivating the echo canceler when the device does not stream the audio to the playback device.

6. The method of claim 1, wherein beamforming coefficients that are used to form the one or more pick-up beams are determined when the device streams the audio to the playback device and not when the device does not stream the audio to the playback device.

7. The method of claim 1, wherein a speech detection algorithm is applied to the clean audio or the clean audio is used for telephony.

8. A device, comprising:
a plurality of microphones; and
a processor configured to:
stream audio to a playback device that is separate from the device,
receive a plurality of microphone signals captured by the plurality of microphones,
determine one or more echo dominant audio signals based on one or more pick-up beams directed towards one or more speakers of the playback device that capture sound emitted from the one or more speakers of the playback device, and
when streaming the audio to the playback device, remove, from the plurality of microphone signals, the sound that is emitted from the one or more speakers and sensed by the plurality of microphones, using the one or more echo dominant audio signals, resulting in echo-reduced audio.

9. The device of claim 8, wherein the one or more echo dominant audio signals are determined by using the one or more pick-up beams to estimate a sound field at each location of the plurality of microphones.

10. The device of claim 8, wherein the one or more pick-up beams are used as the one or more echo dominant audio signals.

11. The device of claim 8, wherein the audio that is streamed by the device to the playback device is captured using the one or more pick-up beams resulting in an enhanced audio that is used as the one or more echo dominant audio signals.

12. The device of claim 8, wherein removing the sound that is emitted from the one or more speakers from the plurality of microphone signals includes activating an echo canceler that uses the one or more echo dominant audio signals as a reference when the device streams the audio to the playback device, and deactivating the echo canceler when the device does not stream the audio to the playback device.

13. The device of claim 8, wherein beamforming coefficients that are used to form the one or more pick-up beams are determined when the device streams the audio to the playback device and not when the device does not stream the audio to the playback device.

14. The device of claim 8, wherein a speech detection algorithm is applied to the echo-reduced audio.

15. A method, performed by a device, comprising:
streaming, by a controller of the device, audio to a playback device that is separate from the device and that is configured to drive one or more speakers of the playback device to emit sound of the audio;
receiving, by the controller, a plurality of microphone signals captured by a plurality of microphones of the device;
when the audio is streamed to the playback device, determining, by the controller, a pick-up beam using the plurality of microphone signals that directs a null toward the one or more speakers of the playback device;
determining, by the controller, one or more clean input audio signals based on the pick-up beam; and
removing, by the controller and from the one or more clean input audio signals, the sound that is emitted from the one or more speakers of the playback device, using the audio that is streamed to the playback device as a reference.

16. The method of claim 15, wherein the one or more clean input audio signals are determined by using the pick-up beam to estimate a sound field at each location of the plurality of microphones.

17. The method of claim 15, wherein the pick-up beam is used as the one or more clean input audio signals.

18. The method of claim 15, wherein removing the sound from the one or more speakers from the plurality of microphone signals includes activating an echo canceler when the device streams the audio to the playback device and deactivating the echo canceler when the device does not stream the audio to the playback device.

19. The method of claim 15, wherein determining the pick-up beam includes determining beamforming coefficients that are used to form the pick-up beam when the device streams the audio to the playback device and not when the device does not stream the audio to the playback device.

20. The method of claim 15, wherein a speech detection algorithm is applied to the one or more clean input audio signals after the sound that is emitted from the one or more speakers is removed.

* * * * *